Jan. 6, 1959  D. K. WUNDERLICH  2,867,676
PROCESS FOR CONDUCTING HIGH TEMPERATURE CONVERSIONS
USING FLUIDIZED SOLIDS AS HEAT EXCHANGE MEDIA
Filed Jan. 4, 1956
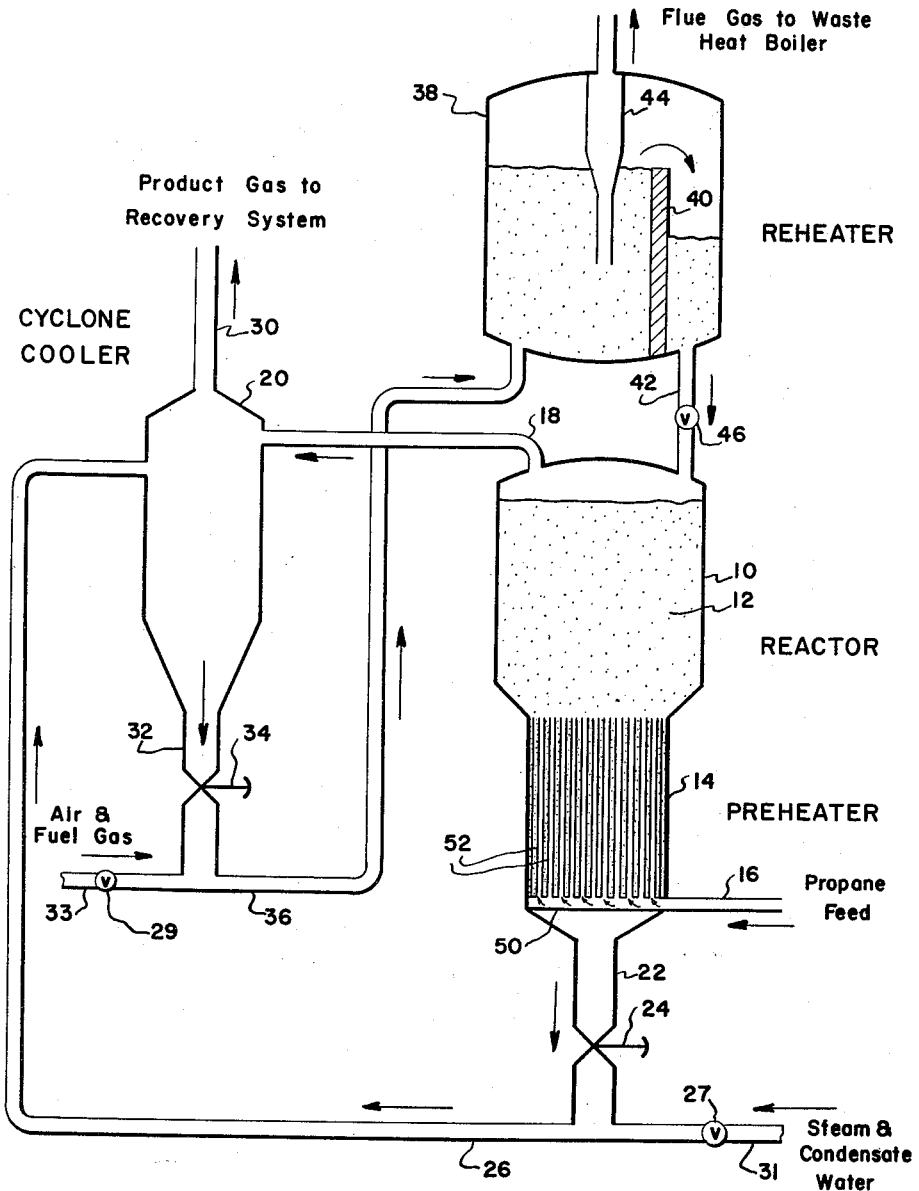
INVENTOR
DONALD K. WUNDERLICH
BY Adams, Forward & McLean
ATTORNEY

United States Patent Office

2,867,676
Patented Jan. 6, 1959

2,867,676

PROCESS FOR CONDUCTING HIGH TEMPERATURE CONVERSIONS USING FLUIDIZED SOLIDS AS HEAT EXCHANGE MEDIA

Donald K. Wunderlich, Chicago, Ill., assignor to Sinclair Refining Company, New York, N. Y., a corporation of Maine Application January 4, 1956, Serial No. 557,307

2 Claims. (Cl. 260—673)

This invention relates to chemical reactions conducted at elevated temperatures. More particularly, the present invention is concerned with an improved process involving chemical reactions at high temperatures which are carried out in the presence of finely divided solid particles.

Many chemical reactions instrumental in the production of new products and in the conversion of certain chemical substances to other more valuable substances require the use of very high temperatures of the order of 1000 to 2500° F. or more. Frequently conversions of a given feed material to a particularly desired product requires stringent control of temperatures and contact times to obtain an economic yield. Also slight variation of a reaction condition in many reactions can lead to an entirely different product from that intended. An example of this situation occurs in the conversion of low molecular weight hydrocarbon gases to acetylene or ethylene. In this process condensation of the unsaturated hydrocarbon to aromatic hydrocarbons occurs quite easily at the temperature employed for its production and the degree of condensation effected frequently is merely a question of residence time; in other words, given the opportunity, the aromatics will result.

The conversion of hydrocarbons at high temperatures in addition to presenting a sensitivity problem is characterized by other and equally serious manipulative obstacles to successful practice. For example, very fine coke and tars result when ethylene, acetylene or aromatics are obtained from the pyrolysis of low molecular weight saturated hydrocarbon gases. The coke and tars present a separatory problem of great magnitude. Additionally, they present a maintenance situation which is quite troublesome and which occurs upon deposition of coke and tars, for example, in conduits and their entrances, and the entire product recovery system. The mere deposition of coke is in itself serious; at the elevated temperatures involved, the problem is magnified. Uncontrolled coke build-up in a reactor also can require extensive off time or the capital investment of additional reactors especially where feed storage facilities are limited.

During the course of studying high temperature chemical conversions a system was devised which eliminates to a great extent many of the problems characteristic of prior art. In the present invention high temperature chemical conversions are carried out in the presence of a fluidized bed of solid particles. The solid particles are handled in the present invention as a circulating stream, and with careful control of their heat content accomplished by adding and abstracting heat according to a defined sequence, chemical conversions are effected in a simple economical manner.

The present invention, broadly, is a method of effecting chemical conversion at high temperatures comprising passing a feed stock in heat exchange relationship with a mass of solids whereby the feed stock is heated to an elevated temperature, passing the thus heated stock into a reaction zone containing a bed of fluidized solids at a desired temperature of reaction whereby conversion of the feed stock or intermediates to product takes place. The product effluent with some of the solids entrained passes out of the reactor and is immediately directed into a cyclone separator cooler system. The descending heat exchanged solids in the preheater section are withdrawn, quenched, preferably with steam or condensate water, and passed into the cyclone separator cooler system where they contact the hot reaction effluent, quenching and effectively scrubbing the product of tars and coke materials entrained therein. By "quenching" is meant the rapid decrease in temperature of a substance.

From the cyclone separator system the scrubbed product is passed to the product recovery system while the solids are withdrawn from a lower portion of the cyclone separator, combined with air and a suitable fuel and conducted to a reheater where the tar and coke deposits are burned, thereby resulting in clean heated particles which can then be reused in the reactor. It can thus be seen that the present invention involves a circulation of solid particles through a sequence of operations including passage through a reaction zone to a preheater section where they are heat exchanged, to a quenching zone where they are used to quench and scrub product effluent, and to a reheating zone so that they can be again used in the reactor.

The method of the present invention can be practiced for many conversion processes, for example, gas pyrolysis, steam cracking, cycle stock hydropyrolysis, residual oil coking and so on. With slight modifications it will be apparent that many other processes can be employed.

The invention will be better understood by reference to the appended drawing which is a schematic representation of apparatus suitable for and appropriately disposed to effect the present invention in an advantageous manner.

Referring now to the drawing, a reactor 10 is provided having an upper enlarged reaction section 12 and a lower smaller preheater section 14. A conduit 16 is provided in the lower portion of the preheater section through which feed stock can be introduced. A conduit 18 is provided in the upper end portion of reactor 10 to conduct product effluent to a cyclone separator cooler 20. Solids are withdrawn from the bottom portion 14 of reactor vessel 10 through a conduit 22 advantageously controlled by a conventional slide valve 24 to a conduit 26 through which the solids can be introduced into the cyclone cooler 20. The product gases exit cyclone 20 through member 30 and are then conducted to a product recovery system (not shown). The solids are withdrawn from the bottom of the cyclone separator 20 through a conduit 32 advantageously provided with a control slide valve 34 to conduit 36 through which the solids can be introduced into solids reheater vessel 38. Reheated solids can be conducted back to the reactor vessel 10 through a conduit 42 which, to advantage, is provided with a valve 46 to permit control of the flow of solids.

Fluids are introduced into the apparatus and circulating solids at various points and for various purposes. For example, a conduit 16 is provided in the lower end portion of preheater 14 to permit introduction of feed stock. A means 31 communicating with conduit 26 and controlled by a suitable valve 27 is provided for the introduction of steam and/or condensate water to effect a lowering of the temperature of solids entering the conduit from the preheater vessel 14 and to provide the energy to gas-lift the solids to the cyclone separator 20. A means 33 communicating with conduit 36 and controlled by a suitable valve 29 facilitates the entrance of fuel and air which serve to gas-lift solids from cyclone 20 to reheater 38 where tar and coke are burned from the particles due to the combustion of the fuel and excess air.

Advantageously, a baffle member 40 is provided within reheater 38 to divide the chamber into two portions. Overflow from the burning section passes over the baffle and collects above the conduit 42 communicating with the upper portion of reactor vessel 12. Combustion products and other gases produced in the reheater are removed by conventional cyclone separator 44 which can be located in the upper portion of reheater 38. To advantage, the reintroduction of the solids to reactor 10 is controlled by a suitable valve 46 in conduit 42.

It is advantageous to provide a header 50 and associated tubes 52 in preheater 14 as shown so that indirect heat exchange can be practiced. The upper ends of the tubes 52 are open and by sizing the tubes in conjunction with feed rates employed, solids are effectively prevented from entering the tubes and thus interfering with feed introduction. The solids can pass downwardly in the spaces between the tubes 52 and thereby be removed. Indirect heat exchange serves to prevent tars and the like which may be picked up in the reaction zone from being transferred from the solids to the feed gas and thus being reintroduced into the reactor. The heat exchange embodiment shown also serves to reduce the amount of coolant otherwise necessary to lower the temperature of the solids so that they are at a temperature suitable for their point of subsequent use. A suitable alternative to the shown relationship of reactor and preheater is the use of a separate preheater vessel containing heated fluidized solids from the circulating system and heating the feed by direct contact with the solids. In such embodiment a conduit would be provided to conduct solids from the reactor to the separate vessel and conduit 26 would extend to this vessel rather than the reactor.

The cyclone separator cooler 20 can be a modified version of the usual cyclone separator; that is, it is provided with the additional conduit which is needed to introduce the solids. The function of the solids in contact with reactor effluent gases in the cyclone separator is twofold. Firstly, a rapid quenching is effected, stopping any continuance of the main reaction and reducing undesirable side reactions to a minimum. And secondly, by virtue of being cooler than the gases and by virtue of being in contact with the gases, tars and coke condense and otherwise deposit on the solids and the product gases are thus effectively scrubbed. To perform the cited functions and to operate satisfactorily as a fluidized bed, the solids can be either catalytic or non-catalytic depending upon the conversion desired. The size distribution is chosen with a view to obtaining satisfactory fluidization commensurate with reaction residence time permissible in view of the temperature of reaction. These considerations are known in the art and need not be discussed at length. However, it is preferred to employ a particle size distribution of about 20 to 100 microns, with about 80 weight percent averaging about 40 to 60 microns and to provide about 10 to 20 pounds of particles per pound of feed employed in the system. The type of solid material chosen depends largely upon its heat stability, heat capacity and thermal conductivity. Suitable materials include porcelain, mullite, silicon carbide, and the oxides and carbides of calcium, magnesium and aluminum.

Operation of reactor 10 is effected to most advantage by employing operating conditions which produce a high fluidized bed, for example at least about as high as three-quarters of the height to the product effluent conduit. These conditions include higher space velocities with a concomitant reduction in bed density. In this manner of operation a larger percentage of solids than is normal in fluidized bed operation will exit with the gaseous product. The advantages resulting include a significant lessening of coke and tar deposition in the effluent line because the entrained solid particles exert a scouring action as they are carried into and through the conduit.

An example of the use of the present invention in conjunction with apparatus of the type and disposition shown in the drawing is as follows: For the pyrolysis of propane to produce aromatic hydrocarbons such as benzene, propane advantageously at ambient temperature, that is, about 70° F., is introduced into preheater 14 through conduit 16. The propane employed can be the usual refinery product containing varying amounts of lower and higher molecular weight hydrocarbons. The propane passes upwardly through tubes 52 and is heated to about 1500° F. by the heat of the solids passing downwardly in the preheater, and at least a portion is cracked to ethylene. The ethylene, in admixture with unconverted propane, exits heat exchange tubes 52 and enters the reaction zone 12 where it contacts the hot fluidized solids maintained in the reactor. Further conversion is effected in reaction zone 12 under the influence of the elevated temperature, i. e. about 1500° F., producing further quantities of ethylene and condensing ethylene to aromatics such as benzene. The ethylene and propane entering the reaction zone serve the additional purpose of being the fluidizing gas necessary to fluidize the solids through additional gases, such as inerts, can be employed for this purpose if necessary.

The gases leaving the fluidized bed contain aromatics, ethylene and unconverted feed stock and exit the reaction zone 12 through conduit 18 which conducts them to cyclone separator cooler 20. Heat exchanged solids from the preheater 14 are withdrawn to conduit 26 where they are contacted with steam or condensate water to lower their temperature to that desired for the product quenching step, for example to about 975° F. The steam also serves as the motivating force to gas-lift the solids to cyclone separator cooler 20. The solids are introduced into the cyclone separator 20 to advantage in a direction and at a point so that they do not enter conduit 18. The low temperature solids contacting the gases which enter the cyclone at high temperature quench the gases to a temperature of about 1050° F. and effectively remove the "mist" of tars and coke from the gases which result upon pyrolysis. Cooled and cleaned gases are then conducted to a product recovery system which can consist of knock-out drums, fractionation, solvent extractors and so on (not shown). The quenching solids are withdrawn from cyclone-separator 20 to conduit 36 wherein they are contacted with air and fuel gas and gas-lifted to reheater 38. In reheater 38 the tars and coke are burned from the solids and the heat released serves to reheat the solids to above the temperature needed in the reactor, i. e. to a temperature of about 1570° F. Clean, heated solids collect above conduit 42 and are reintroduced into reactor 20 as needed.

In the above example circulating about 15 pounds of solid inert heat medium per pound of propane feed, providing a residence time of about 10 seconds and a reactor temperature of about 1500° F., 10,000 pounds per hour of propane feed can be expected to result in an hourly production of the following material in the indicated amounts:

| | Pounds per hour |
|---|---|
| Benzene | 1,480 |
| Gasoline | 180 |
| Naphthalene | 360 |
| Aromatic oil | 960 |
| Hydrogen | 400 |
| $CH_4$ | 3,580 |
| $C_2H_4$ | 2,190 |
| $C_2H_6$ | 150 |
| $C_3H_6$ | 40 |
| $C_3H_8$ | 20 |
| $C_4H_8$ | 60 |
| $C_4H_{10}$ | 150 |
| Coke | 430 |
| Total | 10,000 |

About 600 pounds per hour of coke and tar would pass to the reheater-regenerator and be burned in the process. The temperatures at various points in the circuit would be as follows: reheater, about 1570° F.; solids leaving preheater, about 1100° F.; solids entering the cyclone cooler, about 975° F.; effluent products exiting the cyclone cooler, about 1050° F. About 6000 pounds per hour of exhaust steam and an equivalent amount of condensate water would be required to cool the heat medium and carry it to the cyclone cooler. In addition to the coke burned, about 28,500 standard cubic feet per hour of fuel gas would be required to supply heat in the reheater. About 300,000 standard cubic feet per hour of air would be required to support combustion in the reheater.

As pointed out above, the present invention can be effected with many different processes. Temperatures, pressures, flow rates and other conditions are determined by the conversion intended and the process steps described can be used regardless of specific conditions and still the advantages of the invention, such as the quench-cooling-cleaning phenomenon occuring in separator 20, will be obtained.

What is claimed is:

1. A method for conducting chemical conversions at high temperatures which comprises maintaining a bed of fluidized solids at high temperature in a reaction zone, withdrawing a portion of the solids of said bed and heat exchanging said withdrawn solids with a feed stock, passing the resulting heated feed stock into said bed of fluidized solids to effect conversion to desired product, passing the resulting products of reaction into a cyclone separating zone, cooling the heat exchanged withdrawn solids to a lower temperature and then passing them into contact with said products in said separating zone, recovering cooled and cleaned products from said separating zone, passing said solids from said zone to a reheating zone and burning coke and tar deposits therefrom, and then passing reheated solids into said reaction zone.

2. The method of claim 1 wherein said feed stock is heat exchanged with said solids by passing said feed stock in direct heat exchange relation with said solids.

References Cited in the file of this patent

UNITED STATES PATENTS

| | | |
|---|---|---|
| 2,387,378 | Wolk | Oct. 23, 1945 |
| 2,443,210 | Upham | June 15, 1948 |
| 2,732,330 | Krebs et al. | Jan. 24, 1956 |
| 2,763,600 | Adams et al. | Sept. 18, 1956 |

UNITED STATES PATENT OFFICE
CERTIFICATE OF CORRECTION

Patent No. 2,867,676

January 6, 1959

Donald K. Wunderlich

It is hereby certified that error appears in the printed specification of the above numbered patent requiring correction and that the said Letters Patent should read as corrected below.

Column 6, line 17, for "in direct" read -- in indirect --.

Signed and sealed this 16th day of June 1959.

(SEAL)
Attest:

KARL H. AXLINE
Attesting Officer

ROBERT C. WATSON
Commissioner of Patents